Dec. 25, 1951     H. L. MURCH ET AL     2,580,239
COMPARATOR FOR TRACING CONTOURS OF SOLID OBJECTS
Filed July 11, 1947     6 Sheets-Sheet 4
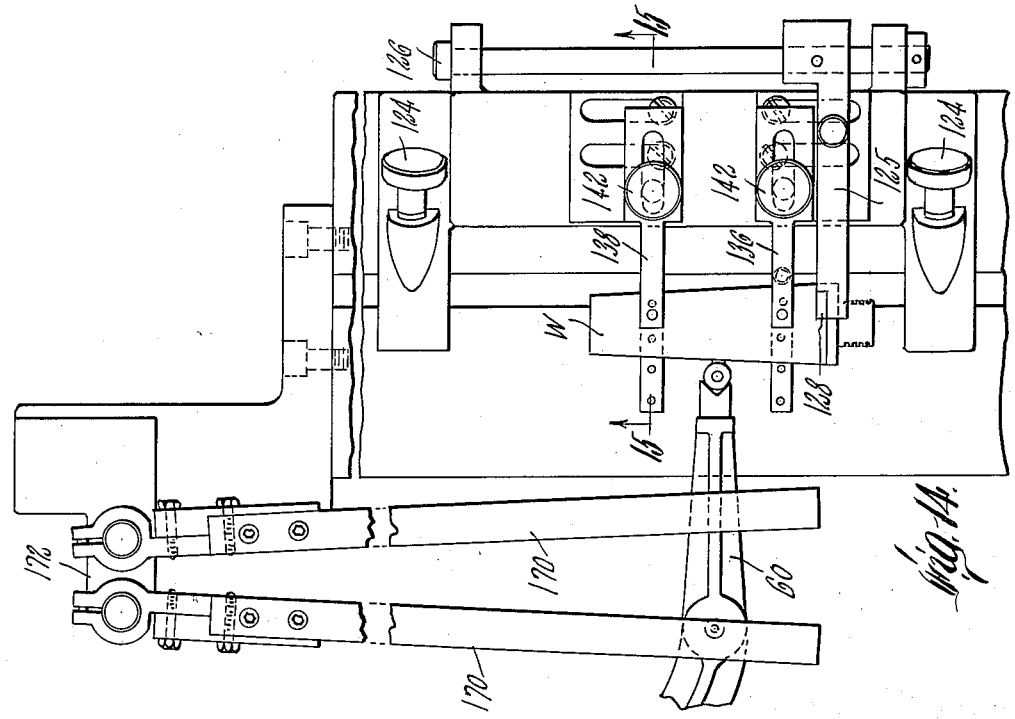
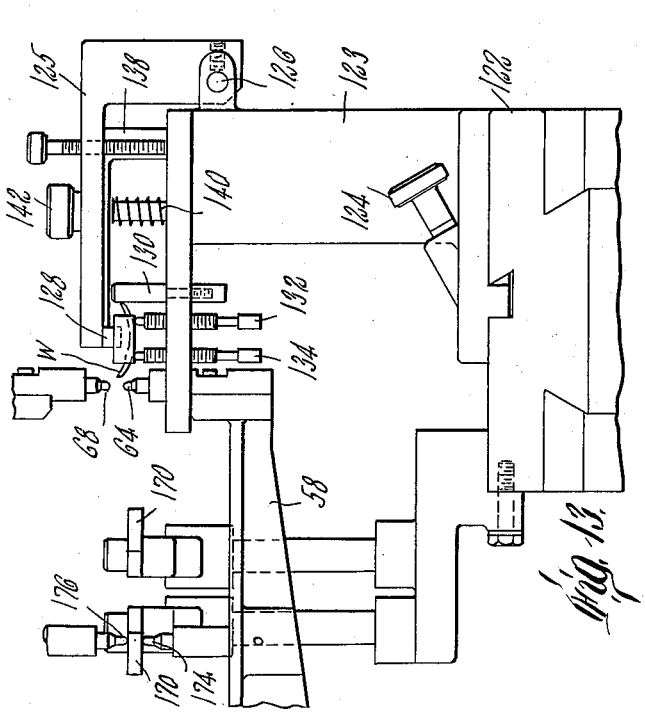
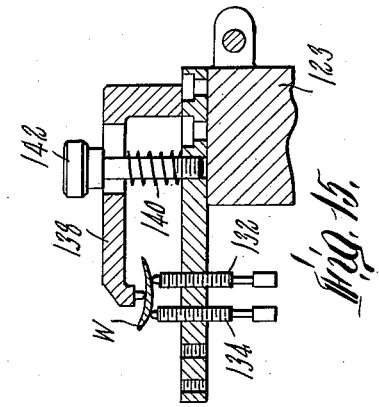

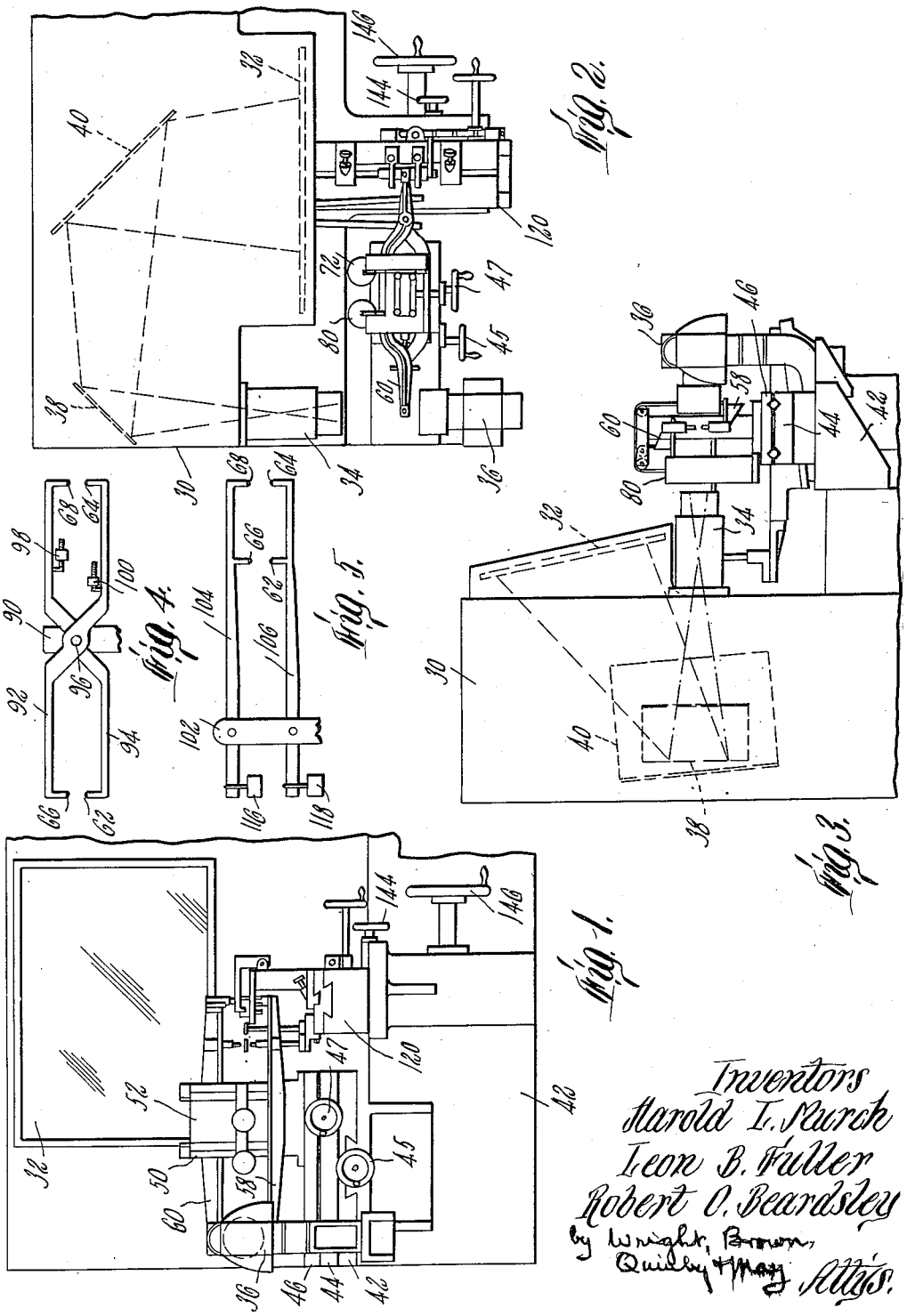

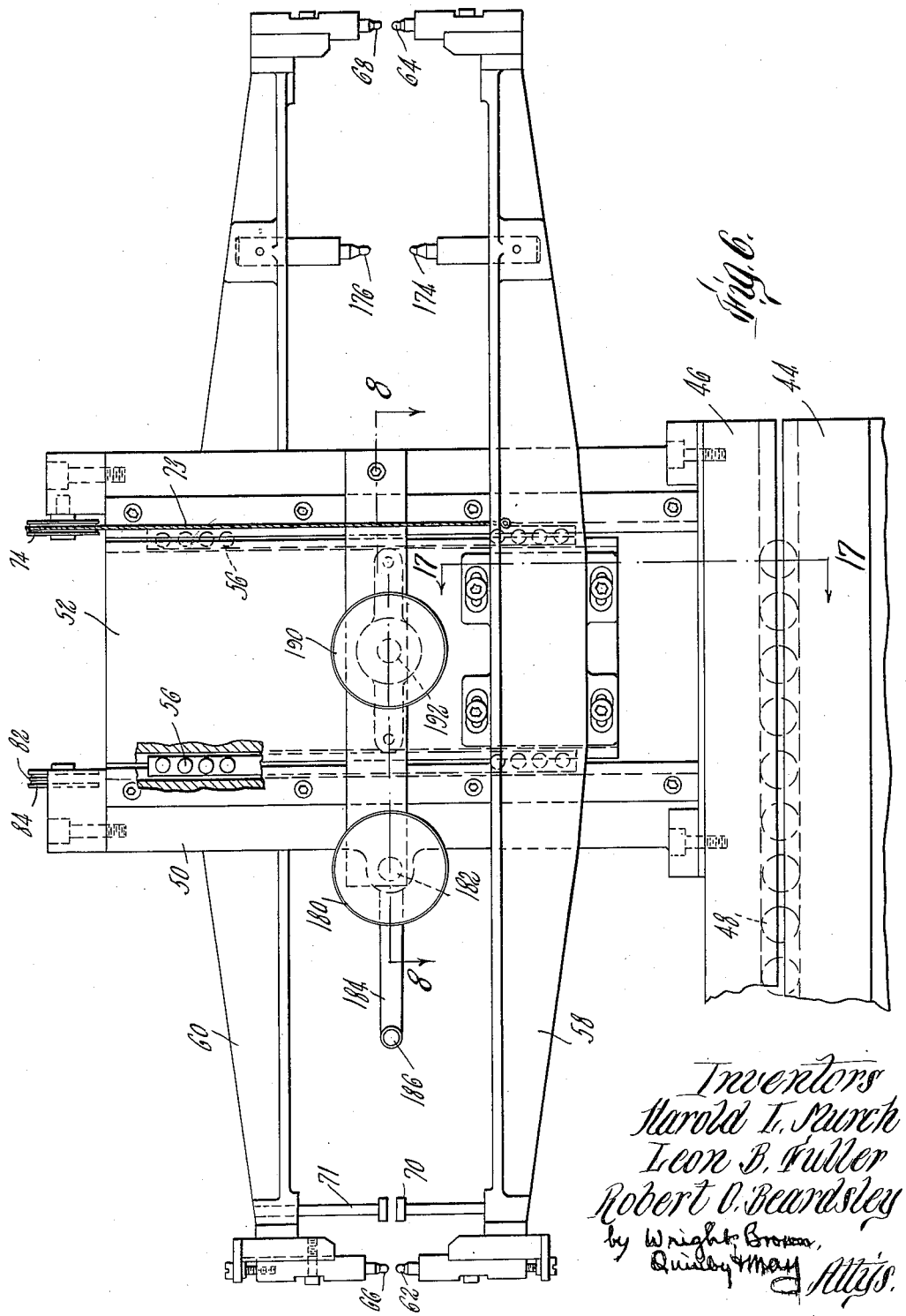

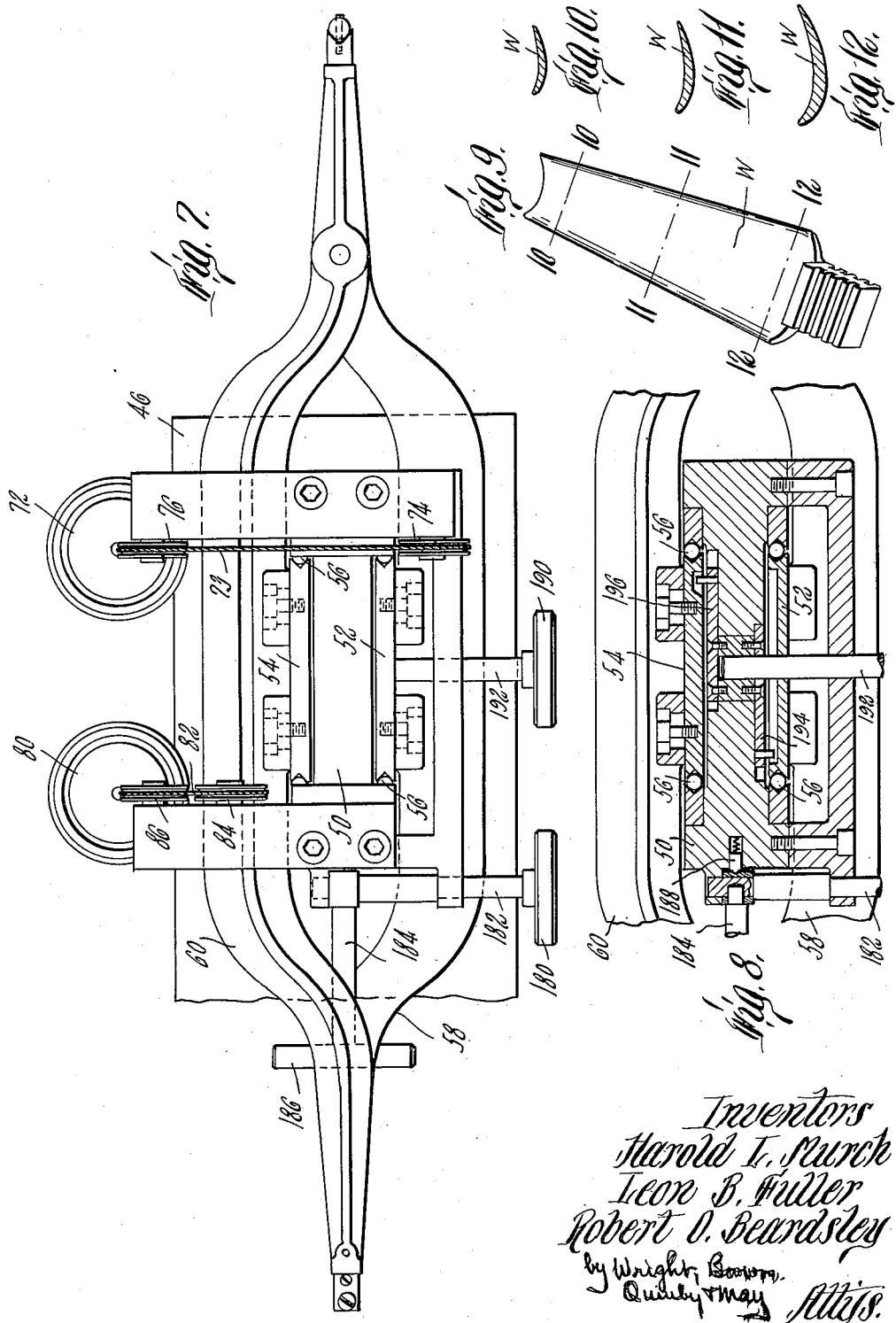

Dec. 25, 1951 H. L. MURCH ET AL 2,580,239
COMPARATOR FOR TRACING CONTOURS OF SOLID OBJECTS
Filed July 11, 1947 6 Sheets-Sheet 5
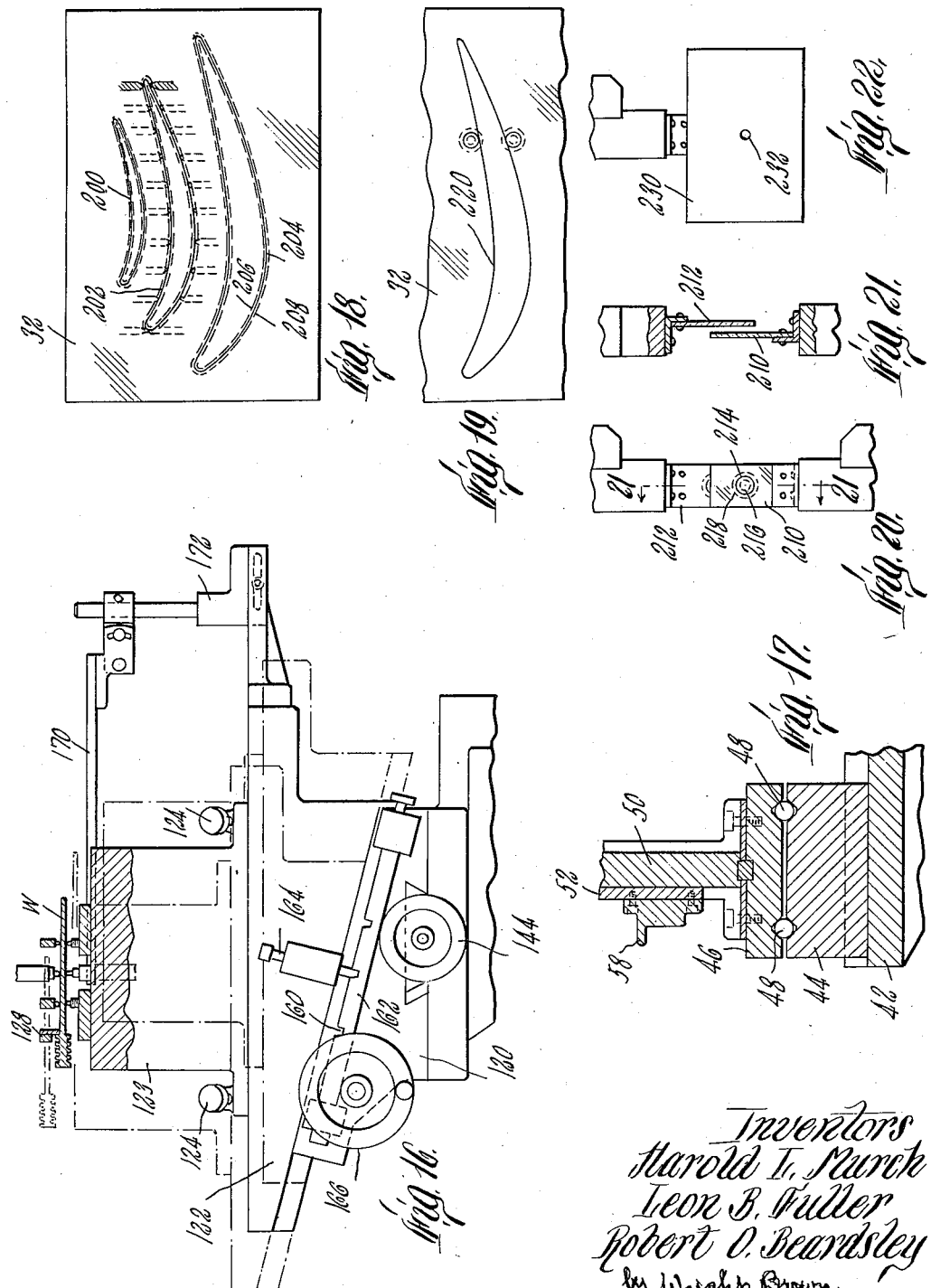

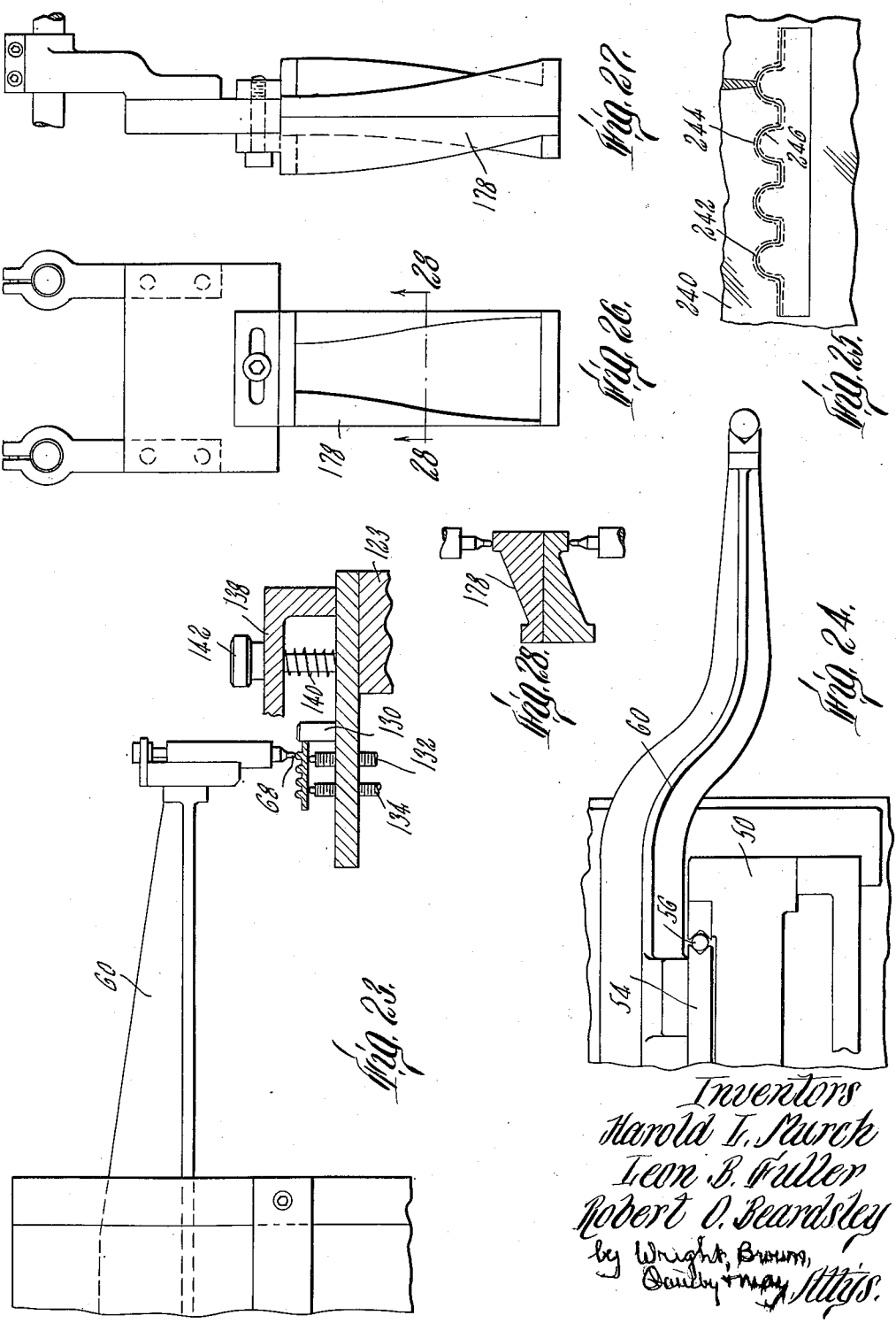

Patented Dec. 25, 1951

2,580,239

UNITED STATES PATENT OFFICE 2,580,239

COMPARATOR FOR TRACING CONTOURS OF SOLID OBJECTS

Harold L. Murch, Leon B. Fuller, and Robert O. Beardsley, Springfield, Vt., assignors to Jones & Lamson Machine Company, Springfield, Vt., a corporation of Vermont Application July 11, 1947, Serial No. 760,228

9 Claims. (Cl. 88—24)

1

This invention relates to apparatus for testing and comparing contours of solid objects such, for example, as turbine blades in which slight changes of shape may have considerable effect in the performance of the blades.

It is an object of the invention to provide apparatus by which an object, such as a turbine blade, can be quickly and accurately tested to ascertain whether its sectional contours on predetermined transverse planes are within tolerated variations from a standard shape.

According to the invention, the work piece is secured in a fixed position adjacent to a carrier on which are carried arms having feeler tips to be moved across the opposite faces of the work piece, these tips being gently pressed against the surfaces so as to follow the contours as they move across the faces. The arms also carry tracing tips which have movements similar to those of the feeler tips. These tracing tips move in a beam of light and their shadow images are enlarged and focused upon a screen so that the magnified movements of the tracing tips can be readily followed. The screen is preferably provided with an outline of the standard contour to be followed by the shadow images of the tracing tips. By relatively moving the work piece and tracing tips longitudinally of the work piece to successive positions, a succession of such contours may be observed and may be compared with corresponding outlines on the screen.

For a more complete understanding of the invention, reference may be had to the description thereof which follows, and to the drawings, of which:

Figure 1 is a front elevation of an apparatus embodying the invention;

Figure 2 is a plan view of the same;

Figure 3 is a side elevation of the same;

Figure 4 is a front elevational view of a modified form of part of the apparatus shown in Figure 1;

Figure 5 is a front elevation of another modified form of the same part of the apparatus;

Figure 6 is a front elevation, on a larger scale, of the carriage shown in Figure 1;

Figure 7 is a plan view of the carriage shown in Figure 6;

Figure 8 is a section on the line 8—8 of Figure 6;

Figure 9 is a perspective view of a sample work piece, such as a turbine blade;

Figures 10, 11, and 12 are sections on lines 10—10, 11—11, and 12—12 of Figure 9;

2

Figure 13 is a front elevational view, on a larger scale, of the work table shown in Figure 1, and some of the related apparatus;

Figure 14 is a plan view of the members shown in Figure 13;

Figure 15 is a section on the line 15—15 of Figure 14;

Figure 16 is a side elevation of the work table and support shown in Figure 13;

Figure 17 is a section on the line 17—17 of Figure 6;

Figure 18 is an elevation of a chart showing contour outlines thereon;

Figure 19 is a fragmentary elevation of a chart showing a contour outline with a different method of indicating tolerances;

Figure 20 is a fragmentary elevational view of a pair of reticles for use instead of tracing tips;

Figure 21 is a section on the line 21—21 of Figure 20;

Figure 22 is a fragmentary elevation of another substitute for a tracing tip;

Figure 23 is a fragmentary elevational view of a modified form of apparatus having a single carrier arm;

Figure 24 is a fragmentary plan view of the apparatus shown in Figure 23;

Figure 25 is a fragmentary elevation of a chart for use with the apparatus shown in Figure 23;

Figure 26 is a plan view of a modified form of a spacing mechanism for the feeler tips;

Figure 27 is a side elevation of the members shown in Figure 26;

Figure 28 is a section on the line 28—28 of Figure 26.

Apparatus embodying the invention may conveniently include a housing 30 carrying a chart 32 on its front wall and a lens system 34 by which a collimated light beam received from a suitable source in a lamp house 36 is magnified and focused on the screen after being reflected by suitable mirrors 38 and 40. The light beam from the lamp housing 36 is projected horizontally from the front of the apparatus toward the rear thereof and is of a diameter at least as great as the maximum diameter of the work piece to be tested. In front of the housing 30 and preferably secured thereto is a base 42 on a portion of which is a horizontal bed 44. The bed is adjustably movable from front to rear by manipulation of a hand wheel 45. A carriage 46 is mounted on horizontal ways on the bed 44 and is movable thereon as by a screw and nut in a direction perpendicular to the direction of the light beam from the lamp house 36. A hand wheel 47 is provided to move the carriage as by a rack on the carriage meshing with a pinion on the shaft of the hand wheel. Since there is considerable movement of the carriage involved in the use of the apparatus, the carriage is preferably mounted on suitable roller or ball bearings 48 such as are indicated in Figures 6 and 17. A standard or support 50 is mounted on the carriage 46 and carries slides 52 and 54 (Figure 7) which are independently and vertically movable in suitable recesses in its front and rear faces. In order that the slides 52 and 54 may be moved with negligible friction, series of ball bearings 56 are employed between the slides and the standard as indicated in Figures 6 and 8.

The slide 52 carries a transverse arm 58 which projects out to the right and left in front of the standard 50 as indicated in Figures 6 and 7. The slide 54 carries another arm 60 which projects to the right and left from behind the standard 50 and is higher than the arm 58. As shown in Figure 7, the projecting portions of these arms are offset so that their extremities are vertically over each other. At the extremities of the lower arm 58 are a tracing tip 62 and a feeler tip 64, respectively. In like manner, at the extremities of the arm 60 are a tracing tip 66 and a feeler tip 68, respectively. The tracing tip 66 is directly over and opposed to the tracing tip 62 so that when the slides 52 and 54 move in opposite directions the tracing tips 62 and 66 move toward or away from each other. In like manner, the feeler tips 64 and 68 are vertically related and are mutually opposed so that these tips move toward or away from each other when the slides 52 and 54 move in the corresponding directions. The tips 62, 64, 66, and 68 are preferably made with similar shapes which may include semi-spherical extremities. Since any appreciable wear of the tips when they are in contact with the work would adversely affect the accuracy of the apparatus, the tips are preferably made of some hard and durable material such as tungsten carbide. Material of this kind is generally subject to fracture if struck. Hence, stop elements 70 and 71 are provided to prevent actual contact between the opposing tracing tips or the opposing feeler tips.

A separate counterweight is provided for each arm, the counterweights being adjusted so that the lower arm 58 tends to rise and the upper arm 60 tends to descend. As shown in Figures 6 and 7, a counterweight 72 for the arm 58 is connected thereto by a wire or cord 73 which passes over a pair of pulleys 74 and 76 on the standard 50, and a counterweight 80 for the arm 60 is connected thereto by a cord or wire 82, this cord passing over a pair of pulleys 84 and 86 mounted on the standard 50. The counterweights 72 and 80 may be in the form of containers holding small steel shot or the like by which the weights can readily be adjusted so that the lower arm 58 presses gently upward and the upper arm 60 presses gently downward against a work piece between them when the feeler tips are drawn across opposite faces of the work piece.

The movement of the feeler tips 64 and 68 with reference to the carriage 46 are vertical, that is, in a direction perpendicular to the direction of the light beam from the lamp house 36 and to the direction of movement of the carriage 46. The movements of the tracing tips 62 and 66 are respectively similar and parallel to the movements of the feeler tips 64 and 68. Hence, any movement of either of the feeler tips is exactly reproduced by a similar movement of the corresponding tracing tip.

Figure 4 indicates an alternative form of arms for carrying the feeler tips and tracing tips. As therein shown, a standard 90 carries a pair of arms 92 and 94 which are rockable thereon as at 96. Opposed feeler tips 64 and 68 are carried at one extremity of these arms, tracing tips 62 and 66 being carried at the other extremity. Weights 98 and 100 are adjustable on these arms to urge the tip 68 gently downward and to urge the tip 64 gently upward.

Figure 5 indicates another modified form of arms. A standard 102 has upper and lower arms 104 and 106 rockably mounted thereon. The upper arm 104 carries a tracing tip 66 and a feeler tip 68. The lower arm carries a tracing tip 62 and a feeler tip 64. Suitable counterweights 116 and 118 are provided so as to regulate the force by which the opposing tips are urged toward each other.

In the form of the invention shown in Figures 1 and 2, the tracing tips 62 and 66 are located in the beam of light which is projected from the lamp house 36 to the lens system 34. The horizontal movements of the tracing tips resulting from movements of the carriage 46 cause magnified horizontal movements to be made by the shadow images of the tracing tips projected on the screen 32. In like manner vertical movements of the tracing tips which are caused by vertical movements of the slides 50 and 52 and the apparatus carried thereby result in magnified vertical movements of the shadow images of the tracing tips on the screen 32. The shadow images on the screen are focused by adjustments of the bed 44 which move the tracing tips toward or from the lens.

On the base 42 to the right of the carriage bed 44 is a bed 120 having inclined ways extending from front to rear on which is slidably mounted a work table 122. This work table, as indicated in Figure 16, has a horizontal top and an inclined bottom so that when the table is adjustably moved from front to rear, the altitude of the top surface changes but the top remains horizontal.

On the work table is mounted a suitable work support 123 having thereon clamping devices by which a work piece is held in fixed position with reference to the table. The customary clamping screws 124 may be used to secure the support adjustably on the table. Figures 13 and 14 illustrate clamping means and a positioning member for a work piece such as a turbine blade W adapted to facilitate the replacement of the work piece by a similar work piece which should be clamped accurately in the same position. The positioning member comprises an arm 125 which is hinged as at 126 so that its free end may be swung into and out of operative position over the work table. The free end of the arm 125 is provided with a stop element 128 against which the base of the work piece can bear in order to establish the proper longitudinal location of the work piece on the table. A vertical pin 130 is mounted on the table to be engaged by an edge of the work piece to assist in properly locating the work piece. Any preferred clamping means may be employed such as pairs of screws 132 and 134 which are adjustable to engage and support the lower surface of the blade at predetermined points, and arms 136 and 138 carried by the support 123 to bear against the upper surface of the work piece so as to hold it firmly in a fixed position. As indicated in Figure 15, each of the clamping arms 136 and 138 is pressed by a spring 140 against the head of an adjusting screw 142. Thus, when the screws 142 are backed off, the arms 136 and 138 rise and release the work piece for easy removal.

For preliminary adjustments of the work piece and the work table, a hand wheel 144 is provided for lateral adjustments and a hand wheel 146 is provided for vertical adjustments (Figures 1 and 2). After the work piece has been properly set in its predetermined position for engagement by the feeler tips 64 and 68, the carriage 46 may be moved by manipulating the wheel 47 to move the feeler tips across the faces of the work piece from one edge to the other. This causes the feeler tips to follow the contour of a cross section of the work piece. The tracing tips reproduce the movements of the corresponding feeler tips and such movements are reproduced in magnified form by shadow images of the tracing tips on the screen 32. At the completion of this transverse movement, the work table with the work piece thereon is thereupon shifted in a front to rear direction to bring another section of the work piece into the plane of movement of the feeler tips. The carriage is then operated to move the feeler tips across the faces of the work piece to trace the contour of this second cross-section. Since it is preferable to indicate the standard outlines of the several cross-sections on the chart with a minimum of overlap and confusion, the level of the work piece is changed when it is shifted longitudinally from one position to another, and the successive shadow images on the chart change levels correspondingly. This is done by the inclined bottom surface of the work table. In order to duplicate the cross-sections of the successive work pieces examined, the successive positions of adjustment of the work table are determined by a series of notches 160 in a bar 162 carried by the work table bed 120. The work table itself carries a plunger 164, the lower end of which is adapted to enter any one of the notches 160. Thus, after the feeler tips have been moved across the work piece when it is held in one position, the plunger 164 is lifted and a hand wheel 166 is operated to move the work table down the inclined surface of the bed 120 to advance the plunger 164 to the next successive notch 160. When the plunger enters this notch, the work piece is then in its next position for testing. By reason of the inclined surface of the work table bed, the elevation or level of the work piece is changed so that the feeler tips and also the tracing tips move at lower levels. Consequently the movements of the shadow images of the tracing tips are at different levels on the screen as indicated in Figure 18. This figure shows standard outlines of three cross-sections of the work piece illustrated in Figure 9. Since the work piece is at different elevations for each section, owing to the inclined face of the work table bed, the outlines do not overlap but are at different levels on the chart.

When operating on objects having blunt edges, it may be desirable for the feeler tips to be spaced apart when they encounter the work piece so as to avoid initial engagement of one or both of these tips on an edge surface of the work piece which is vertical or nearly so. Since the component of movement of the tips caused by travel of the carriage 46 is horizontal, such an engagement might result in damage to the apparatus.

To avoid this, a spacing device may be employed to prevent the feeler tips from coming together when they pass beyond an edge of the work piece. As shown, this device comprises one or more bars or spacing elements 170 carried by an adjustable bracket 172 mounted on the work table 122. The bars extend approximately parallel to the respective edges of the work piece W and are arranged to cooperate with a pair of abutment elements 174 and 176 which are mounted on the arms 58 and 60, respectively, and are mutually opposed. The bars 170 are arranged so that when the feeler tips reach an edge of the work piece, one of the bars is between the abutment elements 174 and 176. The movement of the carriage 46 can thus be reversed without danger of injury to the feeler tips. If the work piece is a blade having a considerable longitudinal twist, it may be desirable to employ a specially shaped spacing piece 178 such as is illustrated in Figures 26-28. It may be noted that when the work table is shifted to present another section of the work piece to the feeler tips, the bars 170 or spacing piece 178 also shift so that the spacing of the feeler tips is always correct no matter what portion of either edge of the work piece they approach.

In using the apparatus it may be necessary at times to raise the upper arm 60 to get it out of the way or to lower the arm 58 or to get both arms out of the way at the same time. For example, if it is desired to explore a rounded or peculiarly shaped edge of the work piece, it may be necessary to feel the contour with one feeler tip at a time, the other feeler tip being temporarily held out of the way. For this purpose a convenient knob 180 is provided in front of the standard 50. The knob is mounted on a shaft 182 from which projects an arm 184 having a cross-piece 186 adapted to swing up or down when the knob is turned and to push either of the arms 58 and 60 out of the way. A spring pressed detent 188 (Figure 8) ordinarily holds the arm 184 in its horizontal position. Similarly, a knob 190 is mounted on a shaft 192 to which are secured two normally horizontal arms 194 and 196 projecting in opposite directions and disposed in depressions in the slides 52 and 54 respectively. Rotation of the knob 190 through an angle of 90° results in an elevation of the arm 60 and a depression of the arm 58 with a consequent wide separation of the feeler tips. This operation is useful to avoid interference between the feeler tips and the supporting and clamping means which grip the work piece when it is desired to shift the work table in the course of an examination of the work piece.

Figure 18 shows a chart 32 on which are three master contour outlines, one above the other, with which the movements of the shadow images on the screen can be compared. The upper outline 200 is a magnified image of the sectional contour shown in Figure 10. The second outline 202 is a contour of the section shown in Figure 11 and the lower outline 204 is a contour of the section shown in Figure 12. Each of these outlines is preferably provided with a dotted inner contour 206 and a dotted outer contour 208 which indicate tolerated deviations from the accurate contour outline shown by the solid line between the dotted lines. Hence, if the shadow images of the extremities of the tracing tips remain between the dotted lines in moving from one edge of the work piece to the other, the test shows the shape of the section to be sufficiently accurate.

Another method of showing limits of tolerance is illustrated in Figures 19, 20, and 21. In place of the tracing tips on the left hand extremities of the arms, transparent plates 210 and 212 are employed, each of these plates being made of glass, transparent plastic or any other suitable material on which is employed a small circle 214 having a radius equal to the radius of curvature of the semispherical feeler tips 64 and 68. In addition there are provided a concentric inner circle 216 and a concentric outer circle 218 of suitable size to indicate the limits of tolerance. On the screen chart, as shown in Figure 19, each outline of a section contour is shown in solid line as at 220. The magnified shadow images of the circles on the plates 210 and 212 appear on the chart 32. If the contour is exactly correct, the shadow images and solid line of the circles will be tangent to the curve 220. Deviations from the correct form will cause the solid circles to move slightly away from the contour or to overlap the contour 220. The shadow images of the dotted circles 216 and 218 indicate clearly whether such variations from the accurate form are within the limits of tolerance. The radius of each of the solid circles 214 is equal to the radius of curvature of the feeler tips 64 and 68.

The error tolerance in the case of some articles may vary for different parts of a contour or for contours on different planes. For example, a smaller error might be tolerated in the contour 200 (Figure 18) than in the contour 204. In such case, the dotted lines indicating the tolerance limits for the contour 200 would be closer to the solid line than the tolerance lines to the contour 204. Likewise, if the plates 210 and 212 are employed, additional dotted circles may be employed to indicate the various tolerance limits.

The shadow images thrown on the chart 32 by the tracing tips of the reticles on the plates 210 and 212 are for the purpose of being observed by an operator of the apparatus. It may be desirable in some cases to make a permanent record of the section contours of the work piece. For this purpose the tracing tips may be replaced by opaque plates 230 each of which is provided with a central hole 232 to permit a beam of light to pass from the light source to the lens system. As the plate 230 moves transversely with respect to the beam of light while the corresponding feeler tip is traversing the surface of the work piece, the small ray of light through the hole 232 traces a line on a sensitized sheet of paper or film supported on the chart 32. When using a tracing element of this kind, it is necessary to trace one surface of the work piece at a time. Hence, the lower arm 58 is thrown out of action while the upper arm is moved with the carriage to cause the feeler tip 68 to move across the work. In like manner the upper arm is held out of action while the lower arm 58 is moved with the carriage to cause the feeler tip 64 to traverse the underside of the work. The result of this operation is to produce a permanent record of the outline of the section of the work piece which can be compared with a standard outline such as is shown in Figure 18 or Figure 19. After the moving ray of light has traced one or more sectional outlines of the work piece on the sensitized paper or film, a brief flash through the optical system over the whole chart will result in a reproduction of the standard outlines on the paper or film, when developed in the usual manner, so that each sectional contour as a whole can be compared directly with the corresponding standard outline as a whole, which is sometimes more advantageous than the progressive point-to-point comparison hereinbefore described.

A somewhat similar apparatus is provided for testing the inner contours of certain objects such as dies, molds, and the like. In cases of this kind where only one surface is to be investigated, one of the tracing arms, such as the lower arm is dispensed with and a single upper arm 60 is employed. This arm, as indicated in Figures 23 and 24, may be identical with the arm 60 shown in Figures 6 and 7 and may be similarly equipped with a feeler tip and a tracing tip. Any suitable clamping means may be provided to hold the work piece in proper fixed position for engagement by the feeler tip 68. Figure 25 shows a fragment of a chart 240 having an outline 242 thereon indicating the correct path which should be followed by the shadow image of the tracing tip as the feeler tip 68 moves across the surface of the work piece in a predetermined plane. Dotted lines 244 and 246 may also be provided to indicate the tolerance limits of deviation from the correct outline 242. Other methods of indicating tolerance limits, such as have been hereinbefore described in connection with the tracing of turbine blade contours, can be employed for effecting similar results.

We claim:

1. In a comparator for casting images on a screen, a base, horizontal ways on said base, a carriage movable on said ways, a standard on said carriage, a pair of independently and vertically movable arms on said standard, a feeler tip on each said arm, said feeler tips being opposed to each other, means tending to move said arms to cause said feeler tips to approach each other, a tracing tip on each said arm, said tracing tips being opposed to each other and similarly spaced from the respective feeler tips, whereby the relative movements of the tracing tips correspond to the relative movements of the feeler tips, a work table on said base, gripping means on said work table for holding a work piece in a predetermined position to be engaged by said feeler tips, means operable to move said carriage so as to cause said feeler tips to traverse opposite faces of a work piece mounted on said table and said tracing tips to move correspondingly, means for projecting a broad beam of light past said tracing tips at right angles to their plane of motion, a screen, and means for focusing the images of the moving tracing tips on said screen.

2. In a comparator, a base, means on said base for horizontally projecting a beam of light, horizontal ways on said base extending in a direction transverse to said beam, a carriage movable on said ways, a standard on said carriage, two members vertically and independently movable on said standard toward and from each other, a feeler tip and a tracing tip on each said member and spaced from each other, the feeler tips being directly opposed to each other and the tracing tips being similarly opposed to each other, a work table adjacent to said carriage, and means on said work table for securing a work piece in a predetermined position, the carriage and work table being so arranged with respect to the light beam that when the feeler tips engage the work piece, the tracing tips are in the path of said light beam.

3. In a comparator, a base, means on said base for horizontally projecting a beam of light, horizontal ways on said base extending in a direction transverse to said beam, a carriage movable on said ways, a standard on said carriage, two members vertically and independently movable on said standard toward and from each other in a direction perpendicular to said light beam and to the direction of movement of said carriage, a feeler tip and a tracing tip on each said member and spaced from each other, the feeler tips being directly opposed to each other and the tracing tips being similarly opposed to each other, means urging each arm with its tips toward the other arm with a constant gentle force, a work table adjacent to said carriage, and means on said work table for securing a work piece in a predetermined position, the carriage and work table being so arranged with respect to the light beam that when the feeler tips engage the work piece, the tracing tips are in the path of said light beam.

4. In a comparator, a base, means on said base for projecting a horizontal beam of light, horizontal ways on said base extending in a direction perpendicular to said beam, a carriage movable on said ways, a standard on said carriage, two slides independently mounted on said standard and vertically movable with respect thereto, an upper transverse arm secured to one said slide, a lower transverse arm secured to the other said slide, a pair of tracing tips mounted on said arms respectively and mutually opposed, a pair of feeler tips mounted on said arms respectively and spaced from said tracing tips, said feeler tips being mutually opposed, counterweights connected to said arms, said counterweights being adjusted to obtain a small downward force on the upper arm and a small upward force on the lower arm, a work table carried by said base, inclined ways for said work table extending transversely with respect to said carriage ways, and means on said work table for gripping a work piece, said carriage and work table being so arranged that when the feeler tips are in contact with a work piece on the table the tracing tips are in the path of said beam of light.

5. In a comparator for casting images on a screen, a base, means on said base for projecting a horizontal light beam, a work table on said base spaced from said beam, means on said table for holding a work piece in a predetermined position, horizontal ways on said base extending transversely with respect to said beam, a carriage movable on said ways toward and from the work table, an arm carried by said carriage and vertically movable thereon, a feeler tip on said arm engaging a surface of the work piece, a tracing element on said arm in said light beam, and means operable to move said arm relatively to the carriage to, and to maintain said turn in, a position in which the feeler tip is substantially spaced from the work piece.

6. In a comparator for casting images on a screen, a base, means on said base for projecting a horizontal light beam, a work table on said base spaced from said beam, means on said table for holding a work piece in a predetermined position, horizontal ways on said base extending in a direction transverse to the beam, a carriage movable on said ways toward and from said work table, two arms carried by said carriage and independently movable up and down relatively thereto, opposed feeler tips on said arms in contact with opposite surfaces of the work piece, a tracing element carried by each said arm in said beam of light to reproduce the movements of the corresponding feeler tip, and means manually operable to move both of said feeler tips vertically away from said surfaces of the work piece.

7. In an apparatus for testing cross-sectional contours of a solid object, a base, means on said base for holding said object in a predetermined position, a bed on said base spaced from said holding means, horizontal ways on said bed, a carriage movable on said ways, a standard on said carriage, two arms vertically and independently movable up and down on said standard, a feeler tip carried by each said arm and movable therewith, said tips being mutually opposed and arranged one over the other for engagement respectively with the upper and lower surfaces of said object, means on said carriage for causing said feeler tips to press gently against said surfaces, said ways being arranged with reference to the holding means in such a manner that movements of the carriage thereon move the feeler tips transversely across the surfaces of the object, opposed abutment elements carried by said arms, and fixed spacing elements engageable by said abutment elements when said feeler tips reach the edges of the object to keep said tips spaced apart.

8. In a comparator for tracing contours of a solid object, a base, means on said base for projecting a horizontal beam of light, a screen, means for casting on said screen a magnified image of an object in said beam, a work table on said base spaced from said beam, means on said table for holding a work piece in a predetermined position, a feeler tip engaging a surface of said work piece, a tracing element in said beam of light, movable means supporting said tip and said tracing element whereby movements of said tip are reproduced in movements by said tracing element, said tracing element including a plate of transparent material having thereon a mark corresponding to an outline of the extremity of said tip and another mark indicating a limit of tolerance, and a contour outline on said screen arranged to cooperate with the projected image of said marks to indicate the accuracy of the surface contour of the object as the feeler tip moves across it.

9. Apparatus for examining a series of cross-sectional contours of an elongated work-piece, comprising a base, means on said base for projecting from the front of the apparatus toward the rear thereof a beam of horizontal parallel light rays, inclined ways on said base offset laterally from said beam and extending from front to rear, a work table slidable on said ways, means for holding said table at any of a number of predetermined stations on said ways, means on said table for holding a work-piece in a fixed, front-to-rear position relative thereto, a feeler element adapted to touch the surface of a work-piece mounted on said table, means on said base for supporting said element for movement in any direction in a predetermined plane perpendicular to said light beam, a tracing element supported in said beam of light and in said plane, means causing said tracing element to duplicate the movements of said feeler element in said plane, a fixed screen, and means for casting on said screen a focused shadow image of said tracing element.

HAROLD L. MURCH.
LEON B. FULLER.
ROBERT O. BEARDSLEY.

(References on following page)

REFERENCES CITED

The following references are of record in the file of this patent:

UNITED STATES PATENTS

| Number | Name | Date |
|---|---|---|
| 1,157,796 | Morehouse | Oct. 26, 1915 |
| 1,255,127 | Baukat | Feb. 5, 1918 |
| 1,589,349 | Bausch et al. | June 22, 1926 |
| 1,665,721 | Stockton | Apr. 10, 1928 |
| 2,035,780 | Beardsley et al. | Mar. 31, 1936 |
| 2,192,529 | Thomas et al. | Mar. 5, 1940 |
| 2,214,376 | Kurtz | Sept. 10, 1940 |
| 2,332,810 | Place | Oct. 28, 1943 |
| 2,386,806 | Ledoux | Oct. 16, 1945 |
| 2,400,942 | Milner | May 28, 1946 |
| 2,451,155 | De Boer et al. | Oct. 12, 1948 |

FOREIGN PATENTS

| Number | Country | Date |
|---|---|---|
| 276,266 | Italy | Sept. 17, 1930 |